Sept. 15, 1925.  
F. C. C. VOGEL  
1,553,651  
WEIGHING APPARATUS  
Filed July 31, 1924

Inventor  
F.C.C.Vogel

Patented Sept. 15, 1925.

1,553,651

UNITED STATES PATENT OFFICE.

FREDERIK CARL CHRISTIAN VOGEL, OF HAMBURG, GERMANY, ASSIGNOR TO THE FIRM VOGEL & HALKE, OF HAMBURG, GERMANY.

WEIGHING APPARATUS.

Application filed July 31, 1924. Serial No. 729,377.

*To all whom it may concern:*

Be it known that I, FREDERIK CARL CHRISTIAN VOGEL, a German citizen of the free and Hanseatic town of Hamburg, residing at Hamburg, Germany, have invented certain new and useful Improvements in Weighing Apparatus, of which the following is a specification.

The present invention relates to improvements in weighing apparatus, and more particularly in weighing apparatus having an indicator-mechanism which is set in operation not directly by the action of the weight or load, but by a special driving gear on or respectively after the release of the latter, in order to avoid excessive stresses on the indicator-mechanism by the action of the load from which stresses often result in a material wear and tear of the said mechanism even after a short period of use and consequently cause inaccurate weighings.

It has already been proposed for the said kind of weighing apparatus to limit the motion of the indicator or pointer actuated by a spring or weight by means of a curved stop piece, the position of the curved stop piece being controlled directly by the foot plate or platform of the weighing apparatus on loading the latter. In contradistinction to such construction a weighing apparatus according to the present invention possesses the advantage of being much simpler in construction and of rendering it possible to arrange the dial or scale plate in front of which the pointer is moving, in a horizontal or inclined position. This arrangement provides a more convenient reading of the indicator by the person standing on the platform, and at the same time a smaller height of the whole weighing apparatus.

With the above end in view my invention consists in certain novel features of construction and combinations of parts as will be hereinafter fully described and pointed out in the claims. Referring to the accompanying sheet of drawings in which I have shown as an example a practical embodiment of the subject matter of invention, viz., a self-acting coin-freed weighing apparatus of the "penny in the slot" type, in which the load to be weighed is acting upon springs—

Figure 1:
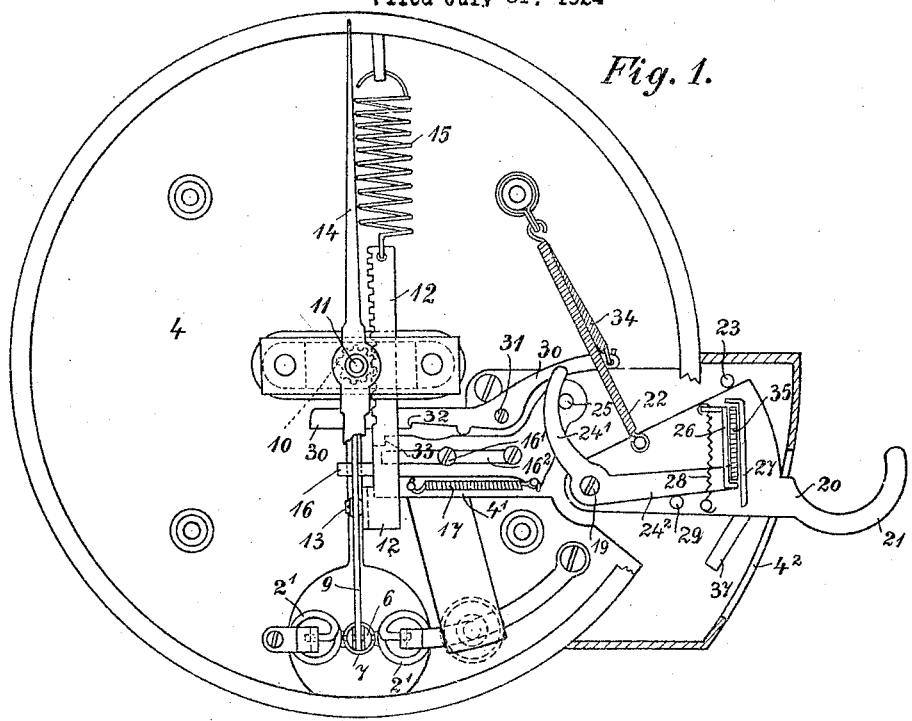
Figure 2:
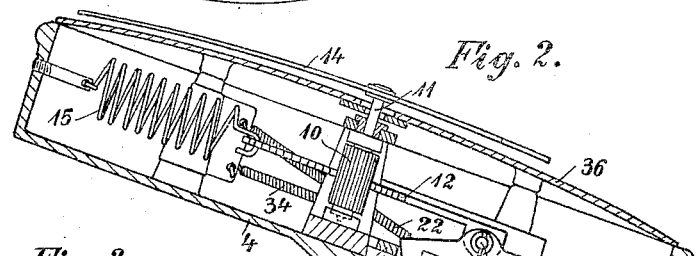
Figure 3:
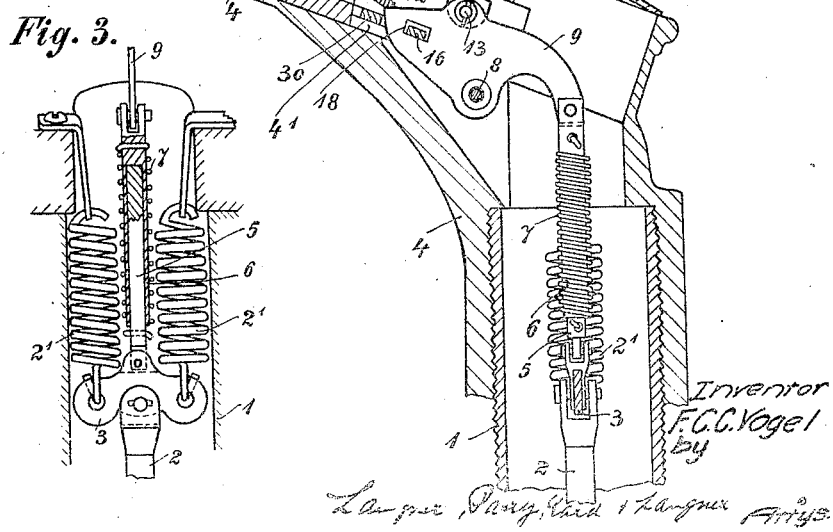

Fig. 1 is a plan view of the upper part of the weighing apparatus containing the indicator mechanism as it appears after the removal of the dial plate; Fig. 2 is a vertical sectional view through the said upper part; and Fig. 3 is a detailed view illustrating the connection of the indicator mechanism with the draw rod.

Similar numerals of reference refer to like parts throughout the figures.

The draw rod 2 actuated by the platform of the weighing apparatus, (not shown in the drawing), is contained in a hollow column 1 and connected with its top end to a cross piece 3, to each free end of which is attached a strong helical spring $2^1$ the other ends of these springs being fixed to the casing of the upper part of the weighing apparatus. To the center part of the cross piece 3 opposite the draw rod 2 is pivotally connected a rod 5 slidable in a cap-like socket 6. A cylindrical spring 7, surrounding the said socket and being fixed with one end to the rod 5 and with the other end to the socket 6, is tending to draw the latter upon and over the rod 5 towards the cross piece 3 until the upper bottom of the said socket strikes against the upper end face of the rod 5. The upper end of the socket 6 is articulated to a lever plate 9 adapted to swing in a vertical plane on the bolt 8 mounted in the casing 4. To the lever plate 9 is hinged by means of a bolt 13 a rack 12 which is in engagement with a pinion 10 of the pointer shaft 11. The arrangement and function of these parts being thus: That when the socket 6 is moved down the rack 12 will be displaced and the pointer 14 turned accordingly, the rack bar 12 being under the yielding action of a suitable spring 15.

On a stationary base plate $4^1$ of the casing 4 is mounted in transverse direction to the lever plate 9, a slide-bolt 16 suitably guided by a pin and slot device $16^1$ $16^2$ shown in Fig. 1. A spring 17 tends to draw the said slide-bolt towards the lever plate 9. When the lever plate is in the position of rest, that is to say when the pointer is in its zero position, the slide-bolt engages an aperture 18 of the lever plate (Fig. 2) whereby the latter is locked. On a pivot 19 on the said base plate supporting the slide-bolt 16 there is rotatably mounted a lever 20. The free end of the lever 20 projects through a slot $4^2$ of the casing 4 and this end is in the form of a hook 21 serving as a handle. A helical spring 22 has the tendency to pull lever 20 against the stop 23. Above the lever 20 there is mounted a bell crank lever $24^1$ $24^2$ also rotatable on the pivot 19. The arm $24^1$ of the bell crank lever engages a pin 25 fixed to the slide-bolt 16, while the other arm $24^2$ carries a wall 26 of a pocket 26, 27. The opposite wall 27 of this pocket is attached to the lever 20 above or in front of a coin slot in the latter. A helical spring 28 tends to keep the arm $24^2$ of the said bell crank lever against stop pin 29 provided on the lever 20. In this position of the bell crank lever its arm $24^1$ rests against the pin 25, while its pocket-wall 26 forms with the opposite pocket-wall 27 a suitable pocket for the reception of a coin or token 35 to be put in and through the ordinary slot of the casing of the weighing apparatus. The coin or its equivalent put into the said pocket formed by the two pocket-walls transmits to the bell crank lever $24^1$, $24^2$ any swinging motion of the lever 20 imparted to it by pulling or pressing down the handle 21.

At the side of the slide-bolt 16 is arranged a locking lever 30 rotatably mounted on a pivot 31. This locking lever rests against the end of the lever plate 9 directed towards the pointer shaft 11, and is provided with a notch 32 which engages a shoulder 33 of the slide-bolt 16, when this latter is disengaged from the aperture 18 of the lever plate 9 and is turned so far as not to bar the motion of the locking lever 30. The motion of the locking lever 30 is effected by means of a spring 34 connected to the other end of the said lever 30.

The functioning or operation of the weighing apparatus is as follows: On putting a coin 35 into the slot of the apparatus, this coin is taken up in the pocket formed by the two pocket walls 26 and 27. When then the person to be weighed has placed himself on the platform of the weighing apparatus the springs $2^1$ take up the load by means of the draw rod 2 and are drawn out more or less by the weight of the load. As the lever plate 9 is locked by the slide-bolt 16, the socket 6 can not follow the downward motion of the draw rod 2; hence it follows that the rod 5 is pulled out of the said socket against the yielding tension of the spring 7. The heavy pressure of the load is thereby prevented from acting upon the lever plate 9 and the other parts of the indicator mechanism.

When thereupon the person standing on the platform pulls down the lever 20 by means of hook 21 a swinging motion is also imparted to the bell crank lever $24^1$, $24^2$ by means of the coin 35 put into the apparatus. The bell crank lever by its swinging motion pulls the slide-bolt 16 out of the aperture 18 of the lever plate 9. The lever plate 9 is now freed and will be rocked by the spring 7 until the socket 6 strikes against the top end of the rod 5 and is stopped thereby in its rocking motion. By this rocking motion the rack 12 has been displaced, whereby the pointer 14 is turned in front of the dial 36 into the proper position according to the downward motion of the draw rod 2 or the weight of the person on the platform respectively. During the rocking of the lever plate 9 the locking lever 30 is disengaged in such a manner that its notch 32 can catch the shoulder 33 of the slide-bolt 16 and secure the latter in the retracted position. If now the person on the platform releases the lever 20, this lever and the bell crank lever will be returned by the springs 22 and 28 respectively into their positions of rest and the coin 35 be allowed to slide down through the slot 37 into a collecting vessel.

When after the weighing operation the person leaves the platform the lever plate 9 directly influenced by the draw rod 2 is pressing at the finish of its return motion the locking lever 30 aside, so that this lever sets free the slide-bolt 16. The latter is thereby allowed to engage again the aperture 18 of the lever plate 9. The indicator mechanism is now locked anew and prevented from the direct action of a subsequent load to be weighed.

When the weighing apparatus is to be made available without the use of a coin or the like, the bell crank lever $24^1$, $24^2$ may be dispensed with and the lever 20 provided with a fixed arm adapted to engage the pin 25.

I claim:

1. Weighing apparatus comprising, a pointer, a releasably locked indicator mechanism having a rockable lever plate adapted to transmit its motion to the pointer, a slide-bolt to lock the plate in zero position of the pointer, a draw-rod influenced from the platform of the weighing apparatus, and a spring connected to the rod and plate, so that on the apparatus being loaded, and the plate unlocked, the spring rocks the plate until it rests on the rod.

2. Weighing apparatus as in claim 1, having a locking lever to retain the slide-bolt for the lever plate in unlocked position, said locking lever being disengaged by the rocking motion of the plate, so that the bolt again locks the plate.

3. Weighing apparatus as in claim 1, having a hand operated lever, and a bell crank lever, the hand operated lever unlocking the lever plate by means of a token coupling the hand and bell crank levers, the latter operating the slide-bolt to unlocking position.

4. Weighing apparatus comprising, a pointer, a releasably locked indicator mechanism having a rockable lever plate adapted to transmit its motion to the pointer, a slide-bolt to lock the plate in zero position of the pointer, a draw-rod influenced from the platform of the weighing apparatus, and a spring connected to the rod and plate, so that on the apparatus being loaded, and the plate unlocked, the spring rocks the plate until it rests on the rod, a locking lever to retain the slide-bolt for the lever plate in unlocked position, said locking lever being disengaged by the rocking motion of the plate, so that the bolt again locks the plate, a hand operated lever, and a bell crank lever, the hand operated lever unlocking the lever plate by means of a token coupling the hand and bell crank levers, the latter operating the slide-bolt to unlocking position.

FREDERIK CARL CHRISTIAN VOGEL.